US005973867A

United States Patent [19]
Yamamoto

[11] Patent Number: 5,973,867
[45] Date of Patent: Oct. 26, 1999

[54] SIGNAL RECORDING AND PLAYBACK APPARATUS FOR LOCATION MONITORING WHICH RECORDS PRIOR TO SENSOR INPUT

[75] Inventor: Junichi Yamamoto, Kyoto, Japan

[73] Assignee: Mitsubishi Denki Kabushiki Kaisha, Tokyo, Japan

[21] Appl. No.: 08/928,633

[22] Filed: Sep. 12, 1997

Related U.S. Application Data

[63] Continuation of application No. 08/533,348, Sep. 25, 1995, abandoned.

[30] Foreign Application Priority Data

Nov. 10, 1994 [JP] Japan .................................... 6-276481

[51] Int. Cl.$^{6}$ ................................ G11B 5/00; H04N 7/18
[52] U.S. Cl. ................................ 360/5; 348/143; 386/35
[58] Field of Search ................................ 360/5, 6, 69, 71; 348/143; 386/35

[56] References Cited

U.S. PATENT DOCUMENTS 4,630,110 12/1986 Cotton et al. .
4,791,499 12/1988 Mester ........................................ 386/6
4,897,732 1/1990 Kinoshita et al. ........................ 386/118
4,949,173 8/1990 Mitsuhashi .
5,754,449 5/1998 Hoshal et al. .............................. 360/5

FOREIGN PATENT DOCUMENTS 0595709 5/1994 European Pat. Off. .
4126371 2/1993 Germany .
654557 7/1994 Japan .
2250156 5/1992 United Kingdom .

*Primary Examiner*—Aristoyelis M. Psitos
*Assistant Examiner*—Regina Y. Neal

[57] ABSTRACT

A video camera is connected to a video signal amplifier through a video signal input terminal. The video signal amplifier is connected to the input side of an image memory through an A/D converter which converts analog video signals into image data which are digital signals. The image memory is provided with a semiconductor memory for storing video signals converted into digital signals. Thus, it becomes possible to continuously record images from before the opening of a door until after the opening of the door and to thus obtain a magnetic recording and playback apparatus of high monitoring effects.

24 Claims, 7 Drawing Sheets

SIGNAL RECORDING AND PLAYBACK APPARATUS FOR LOCATION MONITORING WHICH RECORDS PRIOR TO SENSOR INPUT

This application is a continuation of application Ser. No. 08/533,348 filed on Sep. 25, 1995, now abandoned.

BACKGROUND OF THE INVENTION

1. Field of the Invention

The present invention relates to a magnetic recording and playback apparatus, particularly a magnetic recording and playback apparatus for controlling recording by sensor input in a monitoring video tape recorder mainly intended for prevention of crimes.

2. Description of the Background Art

An apparatus named sensor VTR or long-hour VTR has already been put to practical use as monitoring VTR mainly intended for prevention of crimes.

Explanation will be given hereafter on the construction and actions of conventional sensor VTR and long-hour VTR by using FIG. 7. FIG. 7 is a block diagram showing the construction and actions of sensor VTR and long-hour VTR. In FIG. 7, a video camera 201 is connected to a video signal amplifier 1 through a video signal input terminal 203. The video signal amplifier 1 is connected with a video signal recording device 2 for modulating video signals, the video signal recording device 2 may be into FM signals an FM modulator. The video signal recording device 2 is connected with an FM signal amplifier 3 for amplifying FM signals and recording them on magnetic tape by passing recording current to the video head.

The FM signal amplifier 3 is connected in such a way that its output signals may be given to video heads VL and VR incorporated in a rotary drum 100 through an I/O selecting switch 4 for switching input and output of the video heads in both recording mode and playback mode.

Moreover, the video heads VL and VR are connected in such a way that their output signals may be given to a video signal playback device 5 which may include an FM demodulator, through the I/O selecting switch 4. The video signal playback device 5 is connected to a video output terminal OUT.

The rotary drum 100 gets in contact with a magnetic tape 101 while turning, and the magnetic tape 101 is conveyed by being pinched between rotating capstan shaft 102 and pinch roller 103. Moreover, the capstan shaft 102 rotates by receiving the rotation of a non-illustrated capstan motor which is connected to a capstan motor driving device 6.

Here, the video signal amplifier 1, video signal recording device 2, FM signal amplifier 3, I/O selecting switch 4, video signal playback device 5 and capstan motor driving device 6 are connected to a system controller 7 and controlled by control signals from the system controller 7. The system controller 7 is a device for outputting control signals by receiving signals from a sensor i.e. a door switch 202 which is attached to a door and closes its contact when the door is opened, for example.

Next, explanation will be given on actions. First, explanation will be given on actions in the case where said construction is used as a sensor VTR which acts in linkage with a sensor. In FIG. 7, the contact of the door switch 202 remains open (hereinafter referred to as "OFF") while the door is closed.

At this time, the system controller 7 maintains the state of standby for recording by detecting that the door switch 202 is OFF. In this state of standby for recording, at least the system controller 7 is working and is constantly detecting the open/close state of the contact of the door switch 202.

In the state of standby for recording, there is no need of working of the video signal amplifier 1, video signal recording device 2 and FM signal amplifier 3, but there are also cases where those devices are put in a state ready for immediate passage to recording state from the state of standby for recording. However, the capstan motor driving device 6 is at stop, the magnetic tape 101 is not conveyed and the image of the video camera 201 is not recorded on the magnetic tape 101.

Here, if someone invades the room by opening the door, the door switch 202 closes (hereinafter referred to as "ON"), and the system controller 7 detects it and starts recording by activating the video signal amplifier 1, video signal recording device 2, FM signal amplifier 3, I/O selecting switch 4, video signal playback device 5 and the capstan motor driving device 6.

The system controller 7 is provided with a timer switch which is not shown in the drawing and is capable of setting the duration of maintenance of recording state after start of recording by setting the recording time in advance by means of this timer switch. Therefore, even if the door is closed immediately after opening, the sensor VTR maintains the recording state until the set time elapses. When the time set by the timer switch has elapsed, the system controller 7 will switch the respective devices to the state of standby for recording again and maintain the state of standby for recording until the door is opened next time. This will make it possible to record the behaviors of anyone who breaks into the room on the magnetic tape 101 during the time set on the timer switch from the point in time when the door is opened.

Next, explanation will be given on actions in the case where said construction is used as a long-play VTR which performs recording over a long period of time. In FIG. 7, the system controller 7 maintains the state of intermittent recording by detecting that the door switch 202 is OFF when the door is closed. In this state of intermittent recording, the system controller 7, video signal amplifier 1, video signal recording device 2 and the FM signal amplifier 3 are working in the recording state. The capstan motor driving device 6 controls the capstan motor in a way to repeat sequential actions of drive→stop→drive→stop. As a result, the magnetic tape 101 is carried intermittently and fragmentary video signals which are discontinuous in time are recorded on the magnetic tape 101. (Hereinafter, the method of recording fragmentary video signals which are discontinuous in time will be designated as "intermittent recording" and the method of continuously recording video signals will be designated as "continuous recording.) Intermittent recording has an advantage of possibility of making a long-hour recording on a single tape.

If, in this state, someone breaks into the room by opening the door, the door switch 202 is turned ON and the system controller 7 detects it and switches the capstan motor driving device 6 to a state of continuous recording. In the state of continuous recording, the capstan motor turns at a constant speed and the magnetic tape 101 is conveyed at a constant speed, making it possible to record video signals which are continuous in time on the magnetic tape. The system controller 7 is provided with a timer switch which is not shown in the drawing and is capable of setting the duration of maintenance of recording state after start of recording by setting the recording time in advance by means of this timer switch. Therefore, even if the door is closed immediately after opening, the long-play VTR maintains the state of continuous recording until the set time elapses and, when the set time has elapsed, the system controller 7 will switch the capstan motor driving device 6 to the state of intermittent recording again and maintain the state of intermittent recording until the door is opened next time. This will make it possible to record the behaviors of anyone who breaks into the room during the time set on the timer switch from the point in time when the door is opened.

As explained above, a conventional sensor VTR recorded images after the point in time when it obtained signals from a sensor represented by a door switch 202 provided on the door. Moreover, a long-play VTR made continuous recording from the point in time when it obtained signals from a sensor but recorded only fragmentary video information which is discontinuous in time about video signals produced before the sensor starts working.

Therefore, the conventional sensor VTR and long-play VTR do not continuously record in detail the situation from before the start of working of the sensor, to know how the invader opened the locked door, for example.

SUMMARY OF THE INVENTION

The present invention is directed to a magnetic recording and playback apparatus for recording and playing back input signals on magnetic recording medium. According to the first aspect of the present invention, the magnetic recording and playback apparatus comprises: a sensor for outputting trigger signals under prescribed conditions; control means for controlling conveyance of magnetic recording medium in a way to stop recording by stopping the conveyance of the magnetic recording medium in the state of standby waiting for the trigger signals to be given and start continuous recording by starting continuous conveyance of the magnetic recording medium at the point in time when the trigger signals are given; and signal preserving means for temporarily preserving the input signals and outputting such preserved input signals in the order of preservation. In the magnetic recording and playback apparatus,the input signals output from the signal preserving means are recorded on the magnetic recording medium.

According to the second aspect of the present invention, the magnetic recording and playback apparatus comprises: a sensor for outputting trigger signals under prescribed conditions; control means for controlling conveyance of magnetic recording medium in a way to perform intermittent recording by intermittently conveying magnetic recording medium in the state of standby waiting for the trigger signals to be given and perform continuous recording by starting continuous conveyance of the magnetic recording medium at the point in time when the trigger signals are given; signal preserving means for temporarily preserving the input signals and outputting such preserved input signals in the order of preservation; and switching means for switching the route of the input signals in such a way that the input signals before preservation in the signal preserving means are recorded on the magnetic recording medium in the state of standby and that the input signals preserved in the signal preserving means are recorded on the magnetic recording medium at the point in time when the trigger signals are given.

According to the third aspect of the present invention, the magnetic recording and playback apparatus comprises: a sensor for outputting trigger signals under prescribed conditions; control means for controlling conveyance of magnetic recording medium in a way to perform intermittent recording by intermittently conveying magnetic recording medium in the state of standby waiting for the trigger signals to be given and perform continuous recording by starting continuous conveyance of the magnetic recording medium at the point in time when the trigger signals are given; and signal preserving means for temporarily preserving the input signals and outputting such preserved input signals in the order of preservation. In the magnetic recording and playback apparatus, the input signals output from the signal preserving means are recorded on the magnetic recording medium.

According to the fourth aspect of the present invention, in the magnetic recording and playback apparatus, the input signals are analog signals, and the signal preserving means comprises analog-digital conversion means for converting the input signals into digital signals; storage means connected to the analog-digital conversion means, for temporarily writing the digital signals in semiconductor memory and reading them out in the order of storage; digital-analog conversion means connected to the storage means, for converting the readout digital signals into the analog signals; and signal storage and control means for controlling the analog-digital conversion means, the storage means and the digital-analog conversion means based on clock signals.

According to the fifth aspect of the present invention, in the magnetic recording and playback apparatus, the semiconductor memory is constructed to have (n+1) addresses from No. 0 to No. n, performing writing and readout of the digital signals in one address with 1 clock of the clock signals and starting writing from the No. 0 address again when the writing of the digital signals reached the No. "n" address, and simultaneously as the digital signals are written, the digital signals written in the storage means "n" clock before are read out.

According to the sixth aspect of the present invention, in the magnetic recording and playback apparatus, the control means further includes time setting means for setting prescribed time period after start of continuous conveyance of the magnetic recording medium, and the prescribed time period defines a period of continuing recording by maintaining continuous conveyance of the magnetic recording medium.

According to the magnetic recording and playback apparatus of the first aspect of the present invention, the input signals produced before the trigger signals are given are output from the signal preserving means and continuously recorded on the magnetic recording medium, because the apparatus is provided with the signal preserving means for temporarily preserving the input signals and outputting such preserved input signals in the order of preservation and that input signals output from the signal preserving means are recorded on the magnetic recording medium.

According to the magnetic recording and playback apparatus of the first aspect of the present invention, because input signals prior to the giving of trigger signals are output from signal preserving means and continuously recorded on magnetic recording medium, it becomes possible, by using a door switch which is attached to a door, etc. and turned ON/OFF according to opening/closing of the door as a sensor, using signals given when the door is opened as trigger signals and having video signals from a video camera monitoring the door as input signals, to continuously record images from before the opening of the door until after the opening of the door on the magnetic recording medium, and thus obtain a magnetic recording and playback apparatus of high monitoring effects.

According to the magnetic recording and playback apparatus of the second aspect of the present invention, the input signals produced before the trigger signals are given are output from the signal preserving means and continuously recorded on the magnetic recording medium, because the apparatus is provided with the signal preserving means for temporarily preserving the input signals and outputting the preserved input signals in the order of preservation and the switching means for switching the route of the input signals in such a way that the input signals before preservation in the signal preserving means are recorded on the magnetic recording medium in the state of standby waiting for the trigger signals to be given and that the input signals preserved in the signal preserving means are recorded on the magnetic recording medium simultaneously as continuous conveyance of the magnetic recording medium at the point in time when the trigger signals are given.

According to the magnetic recording and playback apparatus of the second aspect of the present invention, because input signals stored in the signal preserving means are continuously recorded on magnetic recording medium simultaneously as continuous conveyance of magnetic recording medium is started at the point in time when trigger signals are given, it becomes possible, by using a door switch which is attached to a door, etc. and turned ON/OFF according to opening/closing of the door as a sensor, using signals given when the door is opened as trigger signals and having video signals from a video camera monitoring the door as input signals, to continuously record images from before the opening of the door until after the opening of the door on the magnetic recording medium following intermittently recorded images, and thus obtain a magnetic recording and playback apparatus of high monitoring effects.

According to the magnetic recording and playback apparatus of the third aspect of the present invention, the input signals output from the signal preserving means are intermittently recorded on the magnetic recording medium in the state of standby waiting for the trigger signals to be given and continuously recorded on the magnetic recording medium at the point in time when the trigger signals are given, because the apparatus is provided with the signal preserving means for temporarily preserving the input signals and outputting the preserved input signals in the order of preservation.

According to the magnetic recording and playback apparatus of the third aspect of the present invention, because input signals output from the signal preserving means are intermittently recorded on magnetic recording medium in the state of standby waiting for said trigger signals to be given and continuously recorded on magnetic recording medium from the point in time when trigger signals are given, it becomes possible, by using a door switch which is attached to a door, etc. and turned ON/OFF according to opening/closing of the door as a sensor, using signals given when the door is opened as trigger signals and having video signals from a video camera monitoring the door as input signals, to continuously record images from before the opening of the door until after the opening of the door on the magnetic recording medium following intermittently recorded images, and thus obtain a magnetic recording and playback apparatus of high monitoring effects.

According to the magnetic recording and playback apparatus of the fourth aspect of the present invention, in the case where the input signals are analog signals, the input signals are converted into digital signals through the analog-digital conversion means, said digital signals are temporarily written in the semiconductor memory in the storage means and read out in the order of storage, the readout digital signals are converted into the analog signals and output through the digital-analog conversion means, and all those serial operations are controlled by the signal storage and control means based on the clock signals.

According to the magnetic recording and playback apparatus of the fourth aspect of the present invention, because signal preserving means achieving the function of preserving signals is available when input signals are analog signals, it becomes possible to obtain a construction suitable to a case where video signals which are often given as analog signals are used as input signals.

According to the magnetic recording and playback apparatus of fifth aspect of the present invention, the input signals "n" clocks before the point in time when the trigger signals are given are recorded on the magnetic recording medium which started working continuously with the trigger signals, because the digital signals written "n" clocks before in the storage means are read out as the readout digital signals simultaneously as the digital signals are written.

According to the magnetic recording and playback apparatus of the fifth aspect of the present invention, input signals "n" clocks before the point in time when trigger signals are given are recorded on magnetic recording medium set to work continuously by the trigger signals, making it possible to change the duration of the recording in the state before trigger signals are given to be made on the magnetic recording medium by changing the storing capacity of the semiconductor memory.

According to the magnetic recording and playback apparatus of the sixth aspect of the present invention, continuous conveyance of the magnetic recording medium is maintained to continue recording even after supply of the trigger signals is stopped, because the control means is further provided with the time setting means for stipulating, after the start of continuous conveyance of magnetic recording medium, a period for continuing the recording by maintaining continuous conveyance of the magnetic recording medium.

According to the magnetic recording and playback apparatus of the sixth aspect of the present invention, because continuous conveyance of magnetic recording medium is maintained to continue recording even after the supply of trigger signals is interrupted, input signals output with a delay from the signal preserving means are also recorded and it becomes possible, by using a door switch which is attached to a door, etc. and turned ON/OFF according to opening/closing of the door as a sensor, using signals given when the door is opened as trigger signals and having video signals from a video camera monitoring the door as input signals, to continuously record images from before the opening of the door until the prescribed time set on time setting means elapses after the opening of the door on the magnetic recording medium even when the door is closed immediately after opening, and thus obtain a magnetic recording and playback apparatus of high monitoring effects.

The object of the present invention, which was realized to solve such problem, is to provide a magnetic recording and playback apparatus having a function of continuously recording in detail the situation from before signals from the sensor are obtained.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
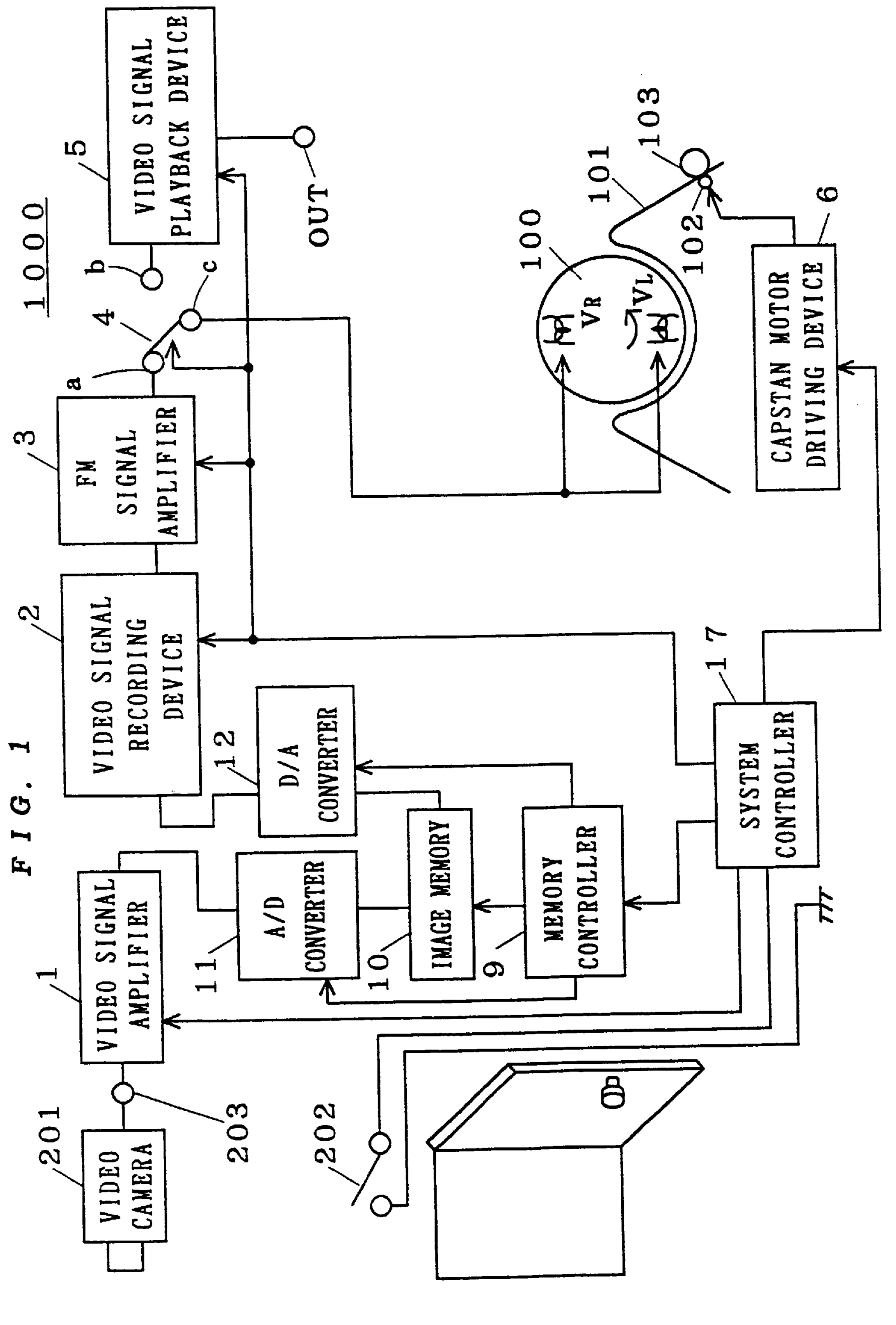
FIG. 1 is a block diagram showing the construction of a first embodiment of the magnetic recording and playback apparatus according to the present invention.

FIG. 1 indicates a block diagram for explaining the construction of the magnetic recording and playback apparatus 1000, of a first embodiment of the present application. In FIG. 1, a video camera 201 is connected to a video signal amplifier 1 through a video signal input terminal 203, and the video signal recording device 1 is connected to the input side of an image memory 10 through an A/D converter 11 for converting video signals given as analog signals into image data which are digital signals. The image memory 10 is a device for storing video signals converted into digital signals and is provided with semiconductor memory.

The output side of the image memory 10 is connected to a D/A converter 12 for reconverting image data stored as digital signals into video signals which are analog signals, and the D/A converter 12 is connected in a way to output analog signals to a video signal recording device 2. Moreover, the A/D converter 11, the image memory 10 and the D/A converter 12 are constructed to be connected to and controlled by a memory controller 9.

The video signal recording device 2 is a device for modulating video signals into FM signals and may include an FM modulator. The video signal recording device 2 is connected with an FM signal amplifier 3 for amplifying FM signals and recording them on magnetic tape by passing recording current to the video head.

The FM signal amplifier 3 is connected in such a way that its output signals may be given to video heads VL and VR incorporated in a rotary drum 100 through an I/O selecting switch 4 for switching input to video heads and output from video heads. Here, the video heads VL and VR represent video heads provided in a way to oppose the periphery of the rotary drum 100 with azimuthal angle inclined to left and right. Although FIG. 1 shows an example in which two video heads VL and VR are provided, the present invention is also applicable to a case having a single video head.

Moreover, the video heads VL and VR are connected in such a way that their output signals may be given to a video signal playback device 5, which may include an FM demodulator, with a switching of the I/O selecting switch 4. The video signal playback device 5 is connected to a video output terminal OUT.

The rotary drum 100 gets in contact with a magnetic tape 101 while turning, and the magnetic tape 101 is carried by being pinched between rotating capstan shaft 102 and pinch roller 103. Moreover, the capstan shaft 102 rotates by receiving the rotation of a non-illustrated capstan motor which is connected to a capstan motor driving device 6.

Here, the video signal amplifier 1, video signal recording device 2, FM signal amplifier 3, I/O selecting switch 4, video signal playback device 5, capstan motor driving device 6 and memory controller 9 are connected to a system controller 17 and controlled by control signals from the system controller 17. The system controller 17 is a device for outputting control signals by receiving signals from a door switch 202 which is attached to a door and closes its contact when the door is opened, for example. The signals given by the door switch 202 are called trigger signals.

Explanation on the capstan motor driving device 6 will be omitted because it has little to do with the present invention, though it has a variety of constructions not indicated in FIG. 1, such as that it is controlled with reference to vertical synchronization signals from the video signal recording device 2, etc.

Next, explanation will be given in detail on the construction of image memory 10, memory controller 9 and system controller 17 by using FIG. 2. The image memory 10 is provided with a RAM unit 10A constituted with dynamic RAM, etc. having (n+1) addresses from No. 0 to No. "n" so that it may store (n+1) words, one word representing several bits. The RAM unit 10A is connected with an input data register 10B acting as writing buffer and an output data register 10C acting as readout buffer. The input data register 10B is connected with the A/D converter 11 through an input port 10D, while the output data register 10C is connected with the D/A converter 12 through an output port 10E.

Moreover, the input data register 10B is also connected with an input address decoder 10F for specifying the address in which to write the input data and a writing timing generating circuit 10G for giving the writing timing of the input data. Similarly, the output data register 10C is connected with an output address decoder 10H for specifying the address of the output data to be read out and a reading timing generating circuit 101 for giving the readout timing of the output data.

The memory controller 9 is generally constituted with gate array, etc. and is provided with a writing address generating circuit 9A for giving addressing signal to the input address decoder 10F of the image memory 10 and a readout address generating circuit 9B for giving addressing signal to the output address decoder 10H of the image memory 10.

The writing address generating circuit 9A and the readout address generating circuit 9B are connected to a clock generating circuit 9C, and the respective addressing signals are output based on clock signals from the clock generating circuit 9C.

The clock generating circuit 9C is also connected to the A/D converter 11 and the D/A converter 12 to control the timing for giving input data and the timing for delivering output data.

Moreover, the memory controller 9 is provided with a writing and readout indicating circuit 9D for giving writing and reading instructions to the writing timing generating circuit 10G and the reading timing generating circuit 101 respectively, and an operation and stop control circuit 9E for controlling the operation and stop of the memory controller 9.

Figure 2:
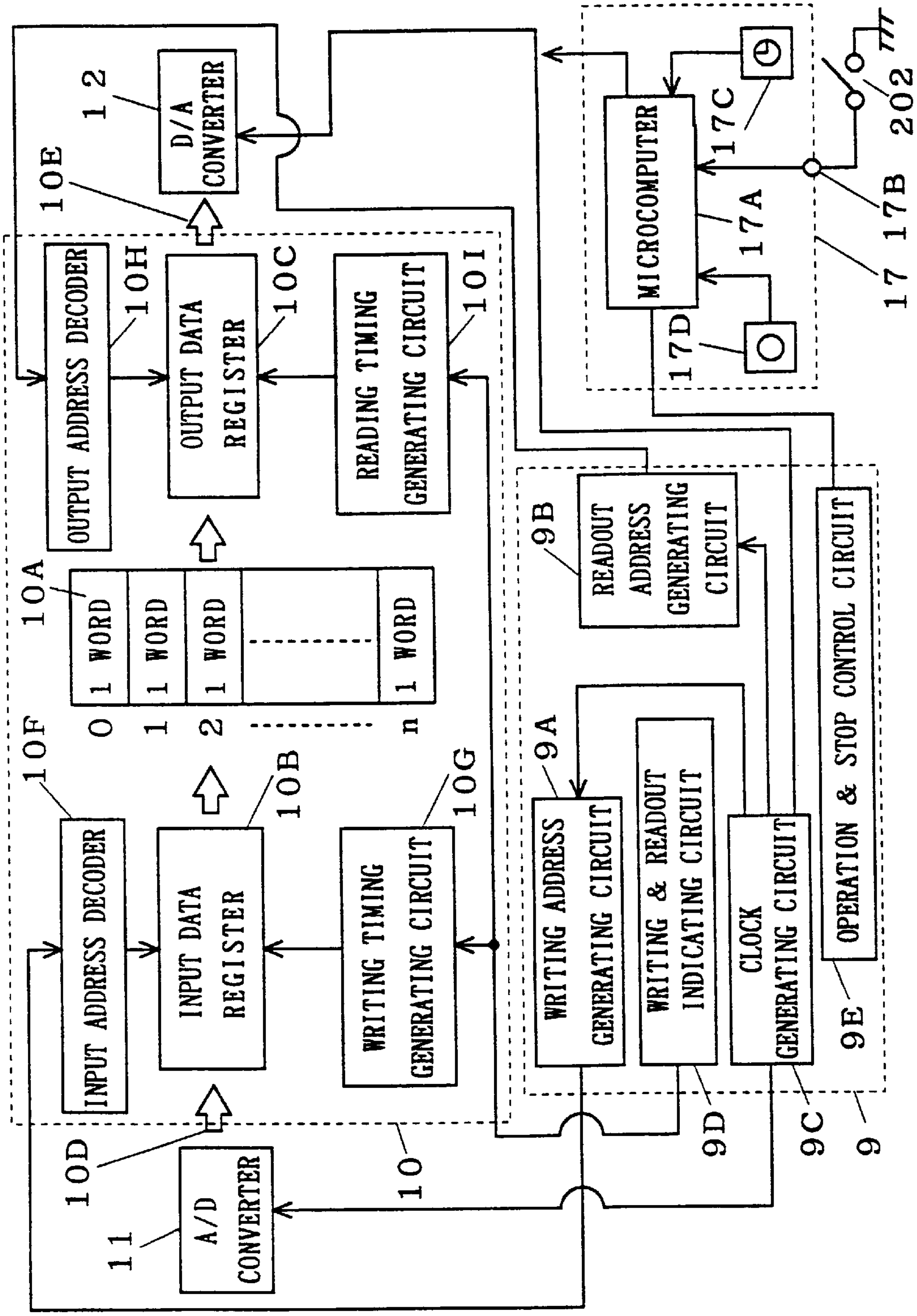
FIG. 2 is a block diagram showing partial construction of the first embodiment of the magnetic recording and playback apparatus according to the present invention.

The system controller 17 is provided with a microcomputer 17A as shown in FIG. 2 and comprises a sensor input terminal 17B for detecting ON/OFF of the door switch 202 and a timer switch 17C for setting the recording time in advance. It also comprises an operation and stop switch 17D for setting the operation and stop of the magnetic recording and playback apparatus 1000. The operation and stop switch 17D is a switch to be turned ON/OFF as required by the operator and it is turned ON for monitoring opening/closing of a door, for example.

Figure 3:
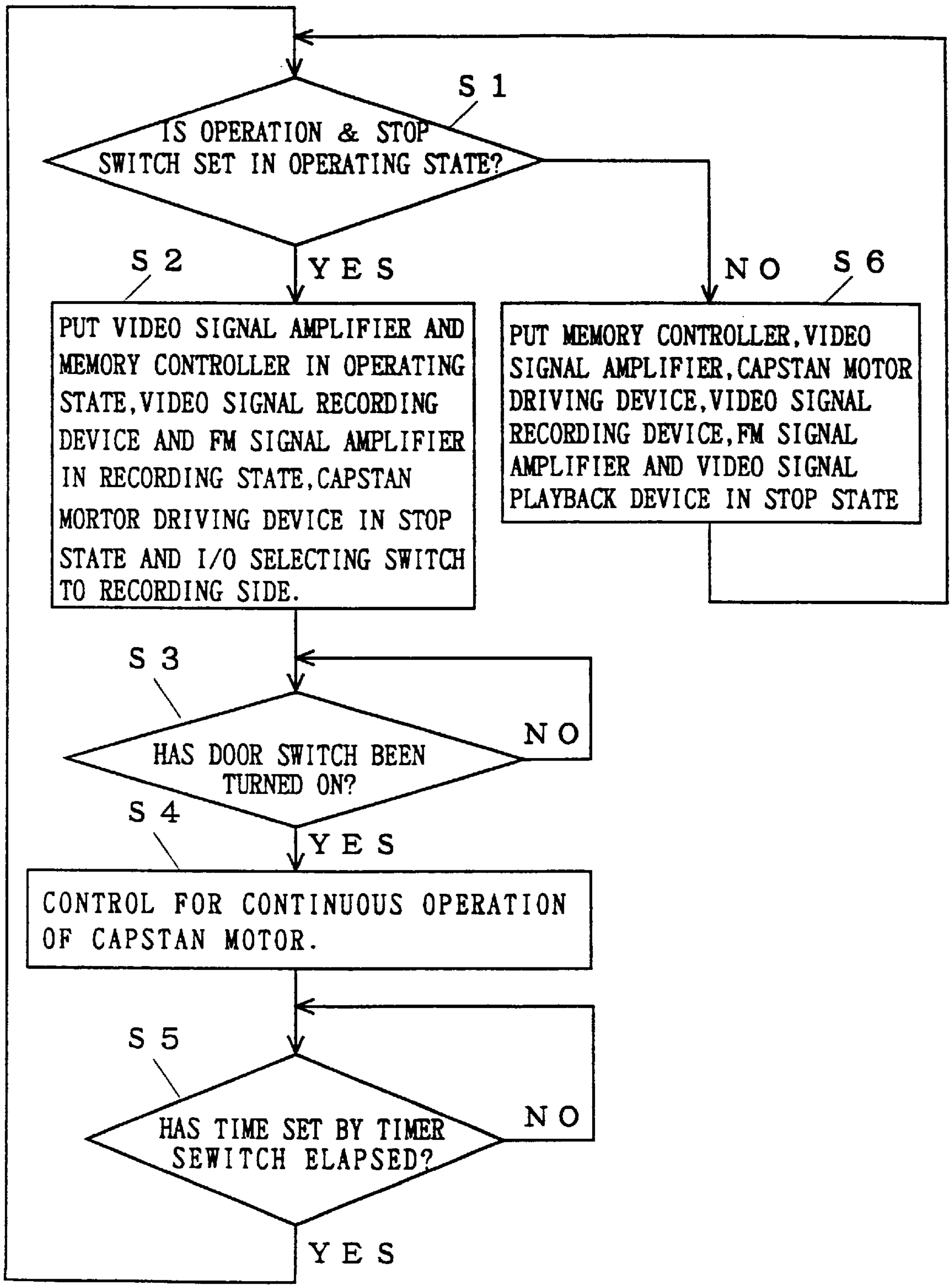
FIG. 3 is a flow chart explaining the actions of the first embodiment of the magnetic recording and playback apparatus.

Next, explanation will be given on the operations of the magnetic recording and playback apparatus 1000 by using FIG. 1 to FIG. 3. In FIG. 1, the door switch 202 is OFF when the door is closed. In that case, the operation and stop switch 17D of the system controller 17 indicated in FIG. 2 is set for the operating state and is performing monitoring.

Under the monitoring system, the system controller 17 outputs control signals for maintaining the state of standby for recording by detecting that the door switch 202 is OFF. Namely, it is in the state waiting for trigger signals. In this state of standby for recording, the operation and stop control circuit 9E of the memory controller 9 is set for operating state, the video signal amplifier 1, the A/D converter 11 and the image memory 10 are working and the I/O selecting switch 4 is connected to the output side, i.e. connected between terminal "a" and terminal "c" in FIG. 1. The system controller 17 is constantly detecting the state of opening/closing of the contact of the door switch 202.

On the other hand, the FM signal amplifier 3, and the video signal recording device 2 and the D/A converter 12 need not work in the state of standby for recording, but may sometimes be left working so that they may immediately pass from the state of standby to the recording state. However, the capstan motor driving device 6 is at stop, the magnetic tape 101 is not conveyed and the image of the video camera 201 is not recorded on the magnetic tape 101.

In this state, the video signals from the video camera 201 are amplified through the video signal amplifier 1, converted into digital signals through the A/D converter 11 and are temporarily retained in the input data register 10B as image data through the input port 10D. The input data register 10B is a buffer for holding data corresponding to one word, and the image data held in the input data register 10B is next written in an address of the RAM unit 10A based on an input address decoder 10F. The input address decoder 10F specifies addresses No. 0 to No. "n" by receiving address specifying signals from the writing address generating circuit 9A of the memory controller 9.

Here, the writing address generating circuit 9A of the memory controller 9 is a circuit intended to increase the writing address in order from No. 0 to No. "n" based on the clock signals from the clock generating circuit 9C, and the image data input through the A/D converter 11 are stored in the respective addresses one by one in order from No. 0 to No. "n" of the RAM unit. And, when the writing is made up to the No. "n" address, new data is stored i.e. overwritten again in order from the No. 0 address.

The image data stored in the RAM unit 10A is read out under control of the output address decoder 10H which receives address specifying signals from the readout address generating circuit 9B of the memory controller 9, and is temporarily retained in the output data register 10C.

The output data register 10C is a buffer for holding data corresponding to one word, and the image data held in the output data register 10C is given sequentially to the D/A converter 12 through the output port 10E and converted again into video signals by this D/A converter 12 to be given to the video signal recording device 2.

The readout address generating circuit 9B of the memory controller 9 is a circuit intended to increase the readout address in order from No. 0 to No. "n" based on the clock signals from the clock generating circuit 9C. However, the readout address generating circuit 9B specifies the address of a number larger by one than the address specified by the writing address generating circuit 9A. Namely, it specifies the address of No. (X+1) if the No. of the address specified by the writing address generating circuit 9A is No. X. Therefore, the image data stored in the RAM unit 10A is read out in order from addresses of smaller numbers and read out again from the No. 0 address after the No. "n" address is reached.

As explained so far, the memory controller 9 controls the image memory 10 in such a way that the image data is written in order from the No. X address of the RAM unit 10A and read out from the No. (X+1) address. Therefore, at the point in time when image data is written in the No. X address, the image data written "n" times before is stored in the No. (X+1) address and the image data to be read out is the image data written "n" times before i.e. earlier by the time corresponding to "n" clocks.

In this way, image data written earlier by the time corresponding to "n" clocks is constantly read out from the image memory 10. The time corresponding to "n" clocks in the present invention is tens of seconds to several minutes.

Here, if someone invades the room, the door switch 202 is turned ON giving trigger signals, and the system controller 17 detects the trigger signals and controls the capstan motor driving device 6 so that the capstan motor may make continuous operation.

Because video signals written earlier by the time corresponding to "n" clocks are constantly being output from the D/A converter 12, the video signals written earlier than turning ON of the door switch 202 by the time corresponding to "n" clocks are recorded on the magnetic tape 101. Moreover, since video signals of the video camera 201 continue to be written in the image memory 10 even after turning ON of the door switch 202, those video signals are recorded on the magnetic tape 101 always with a delay by the time corresponding to "n" clocks. Recording as much information before turning ON of door switch 202 as possible will become possible with the use of a RAM unit with an increased number of addresses for a larger storing capacity.

The system controller 17 is provide with a timer switch 17C as shown in FIG. 2, and, by setting this timer switch 17C in advance, it becomes possible to set the duration of recording state to be maintained after turning ON of the door switch 202 with output of trigger signals for starting the recording. This timer switch 17C allows setting of a time at least equal to the time corresponding to "n" clocks.

Therefore, even if the door is closed immediately after opening, the magnetic recording and playback apparatus 1000 maintains the recording state until the set time has elapses. After the time set by the timer switch 17C elapsed, the system controller 17 will switch the respective devices to the state of standby for recording again and maintain the state of standby for recording until the door is opened next time. This will make it possible to record the behaviors of anyone who breaks into the room up to the time set on the timer switch from before the point in time when the door is opened by the time corresponding to "n" clocks.

The series of actions of the system controller 17 of the magnetic recording and playback apparatus 1000 given above will be explained hereafter by using the flow chart of FIG. 3. In step S1 indicated in FIG. 3, the system controller 17 judges if the operation and stop switch 17D is set for operating state or not i.e. if it is under the monitoring condition or not.

In the case where the operation and stop switch 17D is in the operating state, the memory controller 9 is set to work in step S2 to put the video signal amplifier 1, the video signal recording device 2 and the FM signal amplifier 3 in the recording state and put the capstan motor driving device 6 to stop.

Next, if the door switch 202 is turned ON in step S3, the capstan motor driving device 6 will be switched to the recording state in step S4. If the door switch 202 is not turned ON, the stop condition of the capstan motor driving device 6 will be maintained.

Next, if the time set by the timer switch 17C has elapsed in step S5, the system will return to step S1. If the time set by the timer switch 17C has not elapsed yet, the recording state will be maintained.

If, in step S1, the operation and stop switch 17D is set for stop state, the operations of the memory controller 9, the video signal amplifier 1, the video signal recording device 2, the FM signal amplifier 3, the video signal playback device 5 and the capstan motor driving device 6 will be stopped in step S6.

Figure 4:
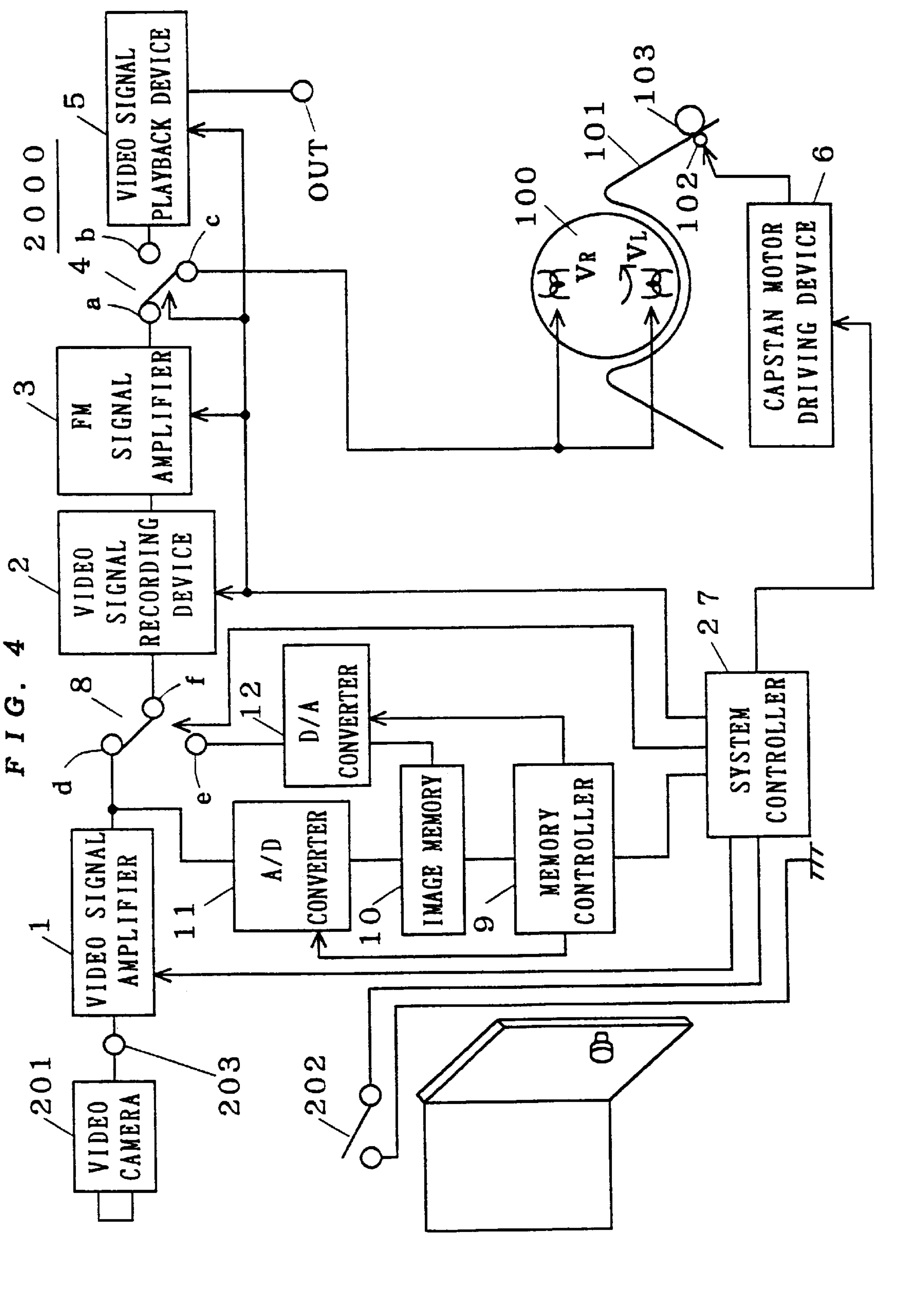
FIG. 4 is a block diagram showing the construction of a second embodiment of the magnetic recording and playback apparatus according to the present invention.

FIG. 4 indicates a block diagram for explaining the construction of the magnetic recording and playback apparatus 1000 of a second embodiment of the present application. In FIG. 4, the same construction as that of the magnetic recording and playback apparatus 1000 indicated in FIG. 1 will be given the same symbols and any overlapping explanation will be omitted.

In FIG. 4, the video signal amplifier 1 and the D/A converter 12 are constructed in such a way that one or the other is connected to the video signal recording device 2 through an input signal selecting switch 8. The input signal selecting switch 8 is a switch for making switching operation according to the control signals given by a system controller 27. Here, any overlapping explanation will be omitted because the system construction is the same as that of the magnetic recording and playback apparatus 1000 indicated in FIG. 1 and FIG. 2 except that the input signal selecting switch 8 has been newly added and that the system controller 17 has been replaced by the system controller 27.

Figure 5:
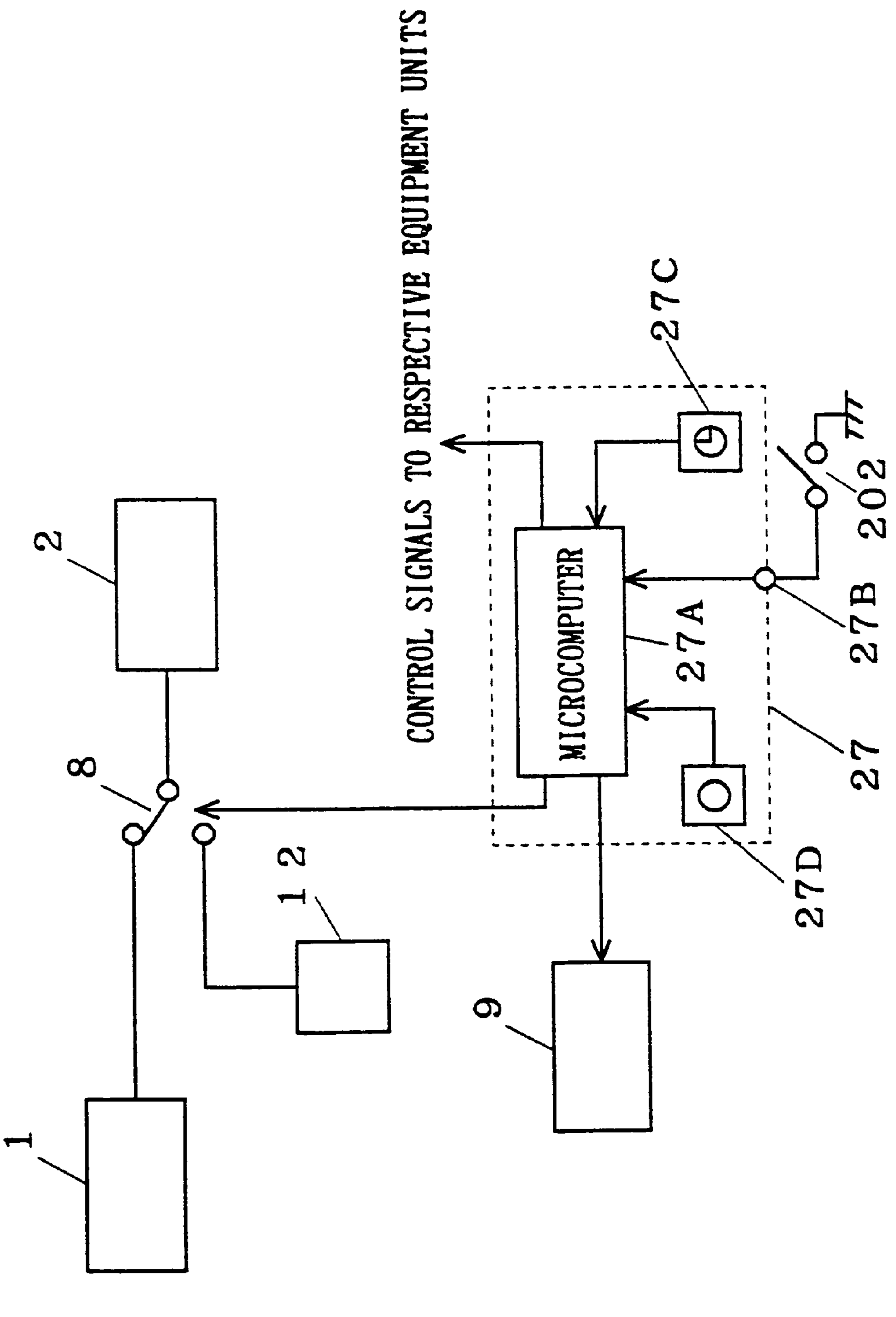
FIG. 5 is a block diagram showing partial construction of the second embodiment of the magnetic recording and playback apparatus, according to the first

Moreover, in FIG. 5 which indicates the construction of the system controller 27, its functions are the same (as those of the system controller 17) except that the microcomputer 17A has been changed to microcomputer 27A which has the functions of giving control signals to the input signal selecting switch 8 and making the capstan motor driving device 6 perform intermittent motions to be described later and that the symbols have been changed from 17B to 27B for sensor input terminal, from 17C to 27C for timer switch and from 17D to 27D for operation and stop switch.

Figure 6:
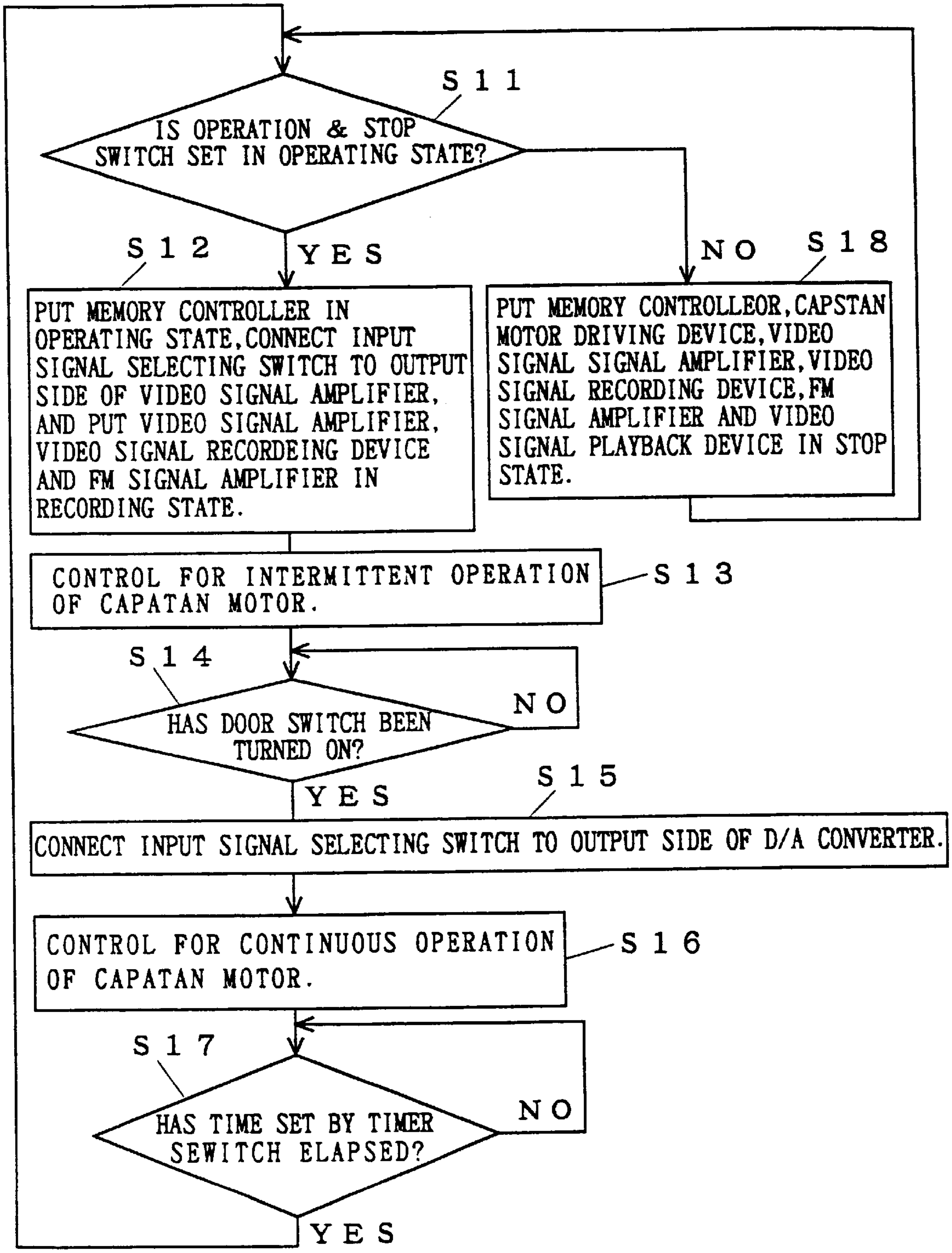
FIG. 6 is a flow chart explaining the actions of the first embodiment of the magnetic recording and playback apparatus.
Figure 7:
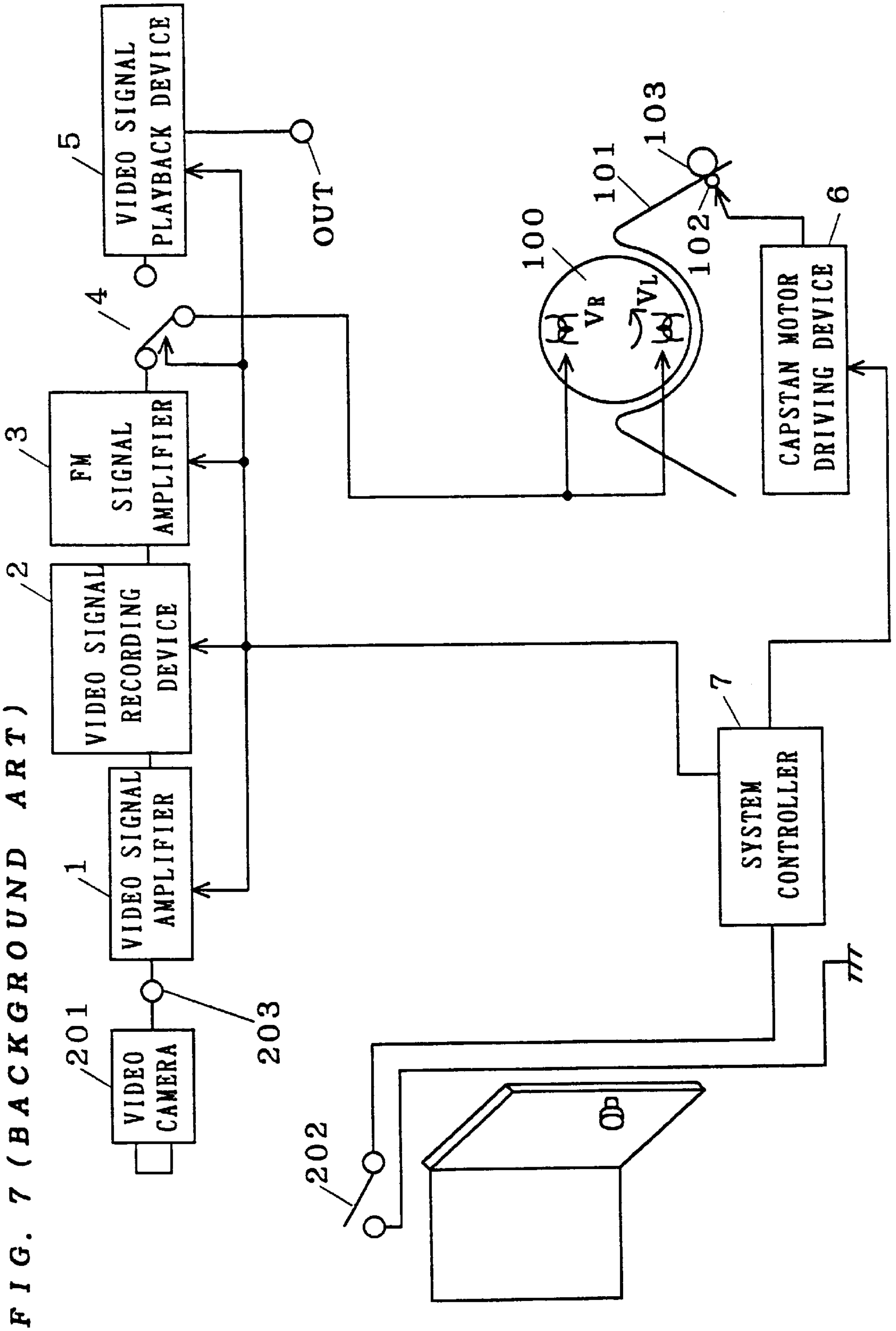
FIG. 7 (BACKGROUND ART)
FIG. 7 is a block diagram showing the construction of a conventional magnetic recording and playback apparatus.

Next, the actions of the magnetic recording and playback apparatus 2000 will be explained hereafter by using FIG. 4 to FIG. 6. In FIG. 4, the door switch 202 remains OFF while the door is closed. In that case, the operation and stop switch 27D of the system controller 27 is set for operating state and is under the monitoring condition.

Under the monitoring condition, the system controller 27 maintains the state of intermittent recording by detecting that the door switch is OFF. Namely, it is in the state waiting for trigger signals. In this state of intermittent recording, the A/D converter 11, the image memory 10, the memory controller 9 and the system controller 27 are working and the input signal selecting switch 8 is connected to the output side, i.e. connected between terminal "d" and terminal "f" in FIG. 4, while the I/O selecting switch is connected to the output side of the FM signal amplifier 3 i.e. between terminal "a" and terminal "c" in FIG. 4.

Moreover, the video signal recording device 2 and the FM signal amplifier 3 are working in the recording state. The capstan motor driving device 6 is controlling the capstan motor in a way to make intermittent operations of repeating sequential actions of drive→stop→drive→stop at regular intervals by receiving control signals from the system controller 27. The system controller 27 continues detecting signals from the door switch 202 while maintaining the state of intermittent recording.

The video signals from the video camera 201 are amplified through the video signal amplifier 1, intermittently recorded on the magnetic tape 101 through the video signal recording device 2 and the FM signal amplifier 3 and, at the same time, converted into digital signals through the A/D converter 11 to be stored in the image memory 10. The construction and actions of the image memory 10 are the same as those explained by using FIG. 2 in the first embodiment, and image data written earlier by the time corresponding to "n" clocks is constantly read out from the image memory 10.

Here, if someone invades the room by opening the door, the door switch 202 is turned ON and trigger signals are output. The system controller 27, detecting the trigger signals, connects the input signal selecting switch 8 to the output side of the D/A converter 12 i.e. connects between terminal "e" and terminal "f" in FIG. 4. At the same time, it switches the capstan motor driving device 6 to the state of continuous recording.

Because video signals written earlier by the time corresponding to "n" clocks are constantly being output from the D/A converter 12, the video signals written earlier than turning ON of the door switch 202 by the time corresponding to "n" clocks are continuously recorded on the magnetic tape 101. Moreover, after turning ON of the door switch 202, the video signals of the video camera 201 continue to be written in the image memory 10 until the set time of the timer switch 27C of the system controller 27 has elapsed and are recorded on the magnetic tape 101 with a delay by the time corresponding to "n" clocks.

Therefore, even if the door is closed immediately after opening, the magnetic recording and playback apparatus 2000 maintains the recording state until the time set by the timer switch 27C has elapsed. When the time set by the timer switch 27C has elapsed, the system controller 27 will perform control in a way to maintain the state of intermittent recording until the door is opened next time. This will make it possible to record the behaviors of anyone who breaks into the room on the magnetic tape 101 until the time set on the timer switch 27C elapses from before the point in time when the door is opened by the time corresponding to "n" clocks.

The series of actions of the system controller 27 of the magnetic recording and playback apparatus 2000 given above will be explained hereafter by using the flow chart of FIG. 6. In step S11 indicated in FIG. 6, the system controller 27 judges if the operation and stop switch 27D is set for operating state or not i.e. if it is under the monitoring condition or not.

In the case where the operation and stop switch 27D is in the operating state, the memory controller 9 is set to work in step S12 to put the video signal amplifier 1, the video signal recording device 2 and the FM signal amplifier 3 in the recording state, and switches the input signal selecting switch 8 in a way to connect between the video signal amplifier 1 and the video signal recording device 2.

Next, the capstan motor driving device 6 is controlled in such a way that the capstan motor performs intermittent operations in step S13.

Next, if the door switch 202 is turned ON in step S14, the input signal selecting switch 8 is switched to connect between the D/A converter 12 and the video signal recording device 2 in step S15. If the door switch 202 is not turned ON at that time, the state of intermittent recording will be maintained.

The capstan motor driving device 6 is controlled in such a way that the capstan motor makes continuous operations in step S16 simultaneously as step 15.

Next, when the time set on the timer switch 27C elapsed in step S17, the processing step returns to S11. If, the time set on the timer switch has not elapsed in step S17, the state of continuous recording will be maintained.

If, in step S11, the operation and stop switch 27D is set for stop state, the operations of the memory controller 9, the video signal amplifier 1, the video signal recording device 2, the FM signal amplifier 3, the video signal playback device 5 and the capstan motor driving device 6 will be stopped in step S18.

The second embodiment explained above indicated a construction realized in a way to maintain the state of intermittent recording by switching the input signal selecting switch 8 and connecting either the video signal amplifier 1 or the D/A converter 12 to the video signal recording device 2 before the door is opened but to keep the magnetic tape 101 in the state of continuous recording until the time set on the timer switch 27C elapses from before the point in time when the door is opened by the time corresponding to "n" clocks, after opening of the door. However, it is possible to obtain a magnetic recording and playback apparatus presenting similar actions even without having this input signal selecting switch 8.

Its construction is the same as that of the magnetic recording and playback apparatus 1000 indicated in FIG. 1, except that the function of the system controller 17 is changed. Namely, while in the first embodiment indicated in FIG. 1 the system controller 17 had a function of maintaining the state of not recording the image of the video camera 201 on the magnetic tape 101 by keeping the capstan motor driving device 6 at stop and without carrying the magnetic tape 101, in the state waiting for trigger signals. What is to be done is to change this function to a function of operating the video signal recording device 2 and the FM signal amplifier 3 in the recording state in the same way as the system controller 27 of the second embodiment indicated in FIG. 4 and controlling the capstan motor driving device 6 in such a way that the capstan motor makes intermittent operations, in the state waiting for trigger signals.

This makes it possible to obtain, with a comparatively simple construction, a magnetic recording and playback apparatus capable of maintaining the state of intermittent recording until trigger signals are given but continuously recording, after trigger signals are given, the state earlier than the point in time when trigger signals are given by the time corresponding to "n" clocks.

While the invention has been shown and described in detail, the foregoing description is in all aspects illustrative and not restrictive. It is therefore understood that numerous modifications and variations can be devised without departing the scope of the invention.

I claim:

1. A magnetic recording and playback apparatus for recording and playing back input signals on a magnetic recording medium comprising:

a sensor provided externally of a body of the magnetic recording and playback apparatus for outputting trigger signals under prescribed conditions;

control means for controlling conveyance of the magnetic recording medium to stop recording by stopping conveyance of the magnetic recording medium in a standby state while waiting for the trigger signals to be output and to start continuous recording by starting continuous conveyance of the magnetic recording medium at a point in time when the trigger signals are output; and signal preserving means for temporarily preserving the input signals and outputting the preserved input signals in order of preservation, said signal preserving means preserving the input signals in order of input while simultaneously outputting the preserved input signals in the order of preservation at any time and repeatedly performing overwriting with new input signals after an amount of preserved input signals exceeds storage capacity, recording of the preserved input signals starting by starting continuous conveyance of the magnetic recording medium at the point in time when the trigger signals are output.

2. The magnetic recording and playback apparatus of claim 1, wherein the input signals are analog signals and said signal preserving means comprises:

analog-digital conversion means for converting the input signals into digital signals;

storage means, connected to said analog-digital conversion means, for temporarily writing the digital signals in a semiconductor memory and for reading out the digital signals from said semiconductor memory in order of storage;

digital-analog conversion means, connected to said storage means, for converting the readout digital signals into readout analog signals, the readout analog signals being the preserved input signals; and signal storage and control means for controlling said analog-digital conversion means, said storage means and said digital-analog conversion means based on clock signals.

3. The magnetic recording and playback apparatus of claim 2, wherein said semiconductor memory has (n+1) addresses designated 0 to n, said storage means performing writing and reading of the digital signals in one address of said semiconductor memory in accordance with one clock of the clock signals, starting writing into said semiconductor memory from address 0 again after writing of the digital signals in address n, and simultaneously as the digital signals are written, reading digital signals written in said semiconductor memory n clock periods of the clock signals earlier.

4. The magnetic recording and playback apparatus of claim 1, wherein said control means comprises:

time setting means for setting a prescribed time period after start of continuous conveyance of the magnetic recording medium, the prescribed time period defining a period of continuous recording such that continuous conveyance of the magnetic recording medium is maintained.

5. The magnetic recording and playback apparatus of claim 1, wherein said sensor is a door switch and outputs the trigger signals upon opening of a door.

6. A magnetic recording and playback apparatus for recording and playing back input signals on a magnetic recording medium comprising:

a sensor provided externally of a body of the magnetic recording and playback apparatus for outputting trigger signals under prescribed conditions;

control means for controlling conveyance of the magnetic recording medium to perform intermittent recording by intermittently conveying the magnetic recording medium in a standby state while waiting for the trigger signals to be output and to perform continuous recording by starting continuous conveyance of the magnetic recording medium at a point in time when the trigger signals are output;

signal preserving means for temporarily preserving the input signals and outputting the preserved input signals in order of preservation; and switching means for switching a route of the input signals such that the input signals are recorded on the magnetic recording medium in the standby state prior to preservation in said signal preserving means and the preserved input signals from said signal preserving means are recorded on the magnetic recording medium at the point in time when the trigger signals are output, said signal preserving means preserving the input signals in order of input while simultaneously outputting the preserved input signals in the order of preservation at any time and repeatedly performing overwriting with new input signals after an amount of preserved input signals exceeds storage capacity, recording of the preserved input signals starting by starting continuous conveyance of the magnetic recording medium at the point in time when the trigger signals are output.

7. The magnetic recording and playback apparatus of claim 6, wherein the input signals are analog signals and said signal preserving means comprises:

analog-digital conversion means for converting the input signals into digital signals;

storage means, connected to said analog-digital conversion means, for temporarily writing the digital signals in a semiconductor memory and for reading out the digital signals from said semiconductor memory in order of storage;

digital-analog conversion means, connected to said storage means, for converting the readout digital signals into readout analog signals, the readout analog signals being the preserved input signals; and signal storage and control means for controlling said analog-digital conversion means, said storage means and said digital-analog conversion means based on clock signals.

8. The magnetic recording and playback apparatus of claim 7, wherein said semiconductor memory has (n+1) addresses designated as 0 to n, said storage means performing writing and reading of the digital signals in one address from said semiconductor memory in accordance with one clock of the clock signals, starting writing into said semiconductor memory from address 0 again after writing of the digital signals in address n, and simultaneously as the digital signals are written, reading digital signals written in said semiconductor memory n clock periods of the clock signals earlier.

9. The magnetic recording and playback apparatus of claim 6, wherein said control means comprises:

time setting means for setting a prescribed time period after start of continuous conveyance of the magnetic recording medium, the prescribed time period defining a period of continuous recording such that continuous conveyance of the magnetic recording medium is maintained.

10. The magnetic recording and playback apparatus of claim 6, wherein said sensor is a door switch and outputs the trigger signals upon opening of a door.

11. The magnetic recording and playback apparatus for recording and playing back input signals on a magnetic recording medium comprising:

a sensor provided externally of a body of the magnetic recording and playback apparatus for outputting trigger signals under prescribed conditions;

control means for controlling conveyance of the magnetic recording medium to perform intermittent recording by intermittently conveying the magnetic recording medium in a standby state while waiting for the trigger signals to be output and to perform continuous recording by starting continuous conveyance of the magnetic recording medium at a point in time when the trigger signals are output; and signal preserving means for temporarily preserving the input signals and outputting the preserved input signals in the order of preservation, said signal preserving means preserving the input signals in order of input while simultaneously outputting the preserved input signals in the order of preservation at any time and repeatedly performing overwriting with new input signals after an amount of preserved input signals exceeds storage capacity, recording of the preserved input signals starting by starting continuous conveyance of the magnetic recording medium at the point in time when the trigger signals are output.

12. The magnetic recording and playback apparatus of claim 11, wherein the input signals are analog signals and said signal preserving means comprises:

analog-digital conversion means for converting the input signals into digital signals;

storage means, connected to said analog-digital conversion means, for temporarily writing the digital signals in a semiconductor memory and for reading out the digital signals from said semiconductor memory in order of storage;

digital-analog conversion means, connected to said storage means, for converting the readout digital signals into readout analog signals, the readout analog signals being the preserved input signals; and signal storage and control means for controlling said analog-digital conversion means, said storage means and said digital-analog conversion means based on clock signals.

13. The magnetic recording and playback apparatus of claim 12, wherein said semiconductor memory has (n+1) addresses designated 0 to n, said storage means performing writing and reading of the digital signals in one address of said semiconductor memory in accordance with one clock of the clock signals, starting writing into said semiconductor memory from said address 0 again after writing of the digital signals in address n, and simultaneously as the digital signals are written, reading digital signals written in said semiconductor memory n clock periods of the clock signals earlier.

14. The magnetic recording and playback apparatus of claim 11, wherein said control means comprises:

time setting means for setting a prescribed time period after start of continuous conveyance of the magnetic recording medium, the prescribed time period defining a period of continuous recording such that continuous conveyance of the magnetic recording medium is maintained.

15. The magnetic recording and playback apparatus of claim 11, wherein said sensor is a door switch and outputs the trigger signals upon opening of a door.

16. A signal recording and playback apparatus for recording and playing back input signals on a signal recording medium, comprising:

a sensor provided externally of a body of the signal recording and playback apparatus for outputting trigger signals under prescribed conditions;

control means for controlling a recording operation on the signal recording medium to stop recording by stopping a recording operation on the signal recording medium during a standby state while waiting for the trigger signals to be output and to start continuous recording on the signal recording medium at a point in time when the trigger signals are output; and signal preserving means for temporarily preserving the input signals and outputting the preserved input signals in order of preservation, said signal preserving means preserving the input signals in order of input while simultaneously outputting the preserved input signals in the order of preservation at any time and repeatedly performing overwriting with new input signals after an amount of preserved input signals exceeds storage capacity, recording of the preserved input signals on the signal recording medium starting at a point in time when the trigger signals are output.

17. The signal recording medium and playback apparatus of claim 16, wherein the input signals are analog signals and said signal preserving means comprises:

analog-digital conversion means for converting the input signals into digital signals;

storage means, connected to said analog-digital conversion means, for temporarily writing the digital signals in a semiconductor memory and for reading out the digital signals from said semiconductor memory in order of storage;

digital-analog conversion means, connected to said storage means, for converting the readout digital signals into readout analog signals, the readout analog signals being the preserved input signals; and signal storage and control means for controlling said analog-digital conversion means, said storage means and said digital-analog conversion means based on clock signals.

18. The signal recording and playback apparatus of claim 17, wherein said semiconductor memory has (n+1) addresses designated 0 to n, said storage means performing writing and reading of the digital signals in one address of said semiconductor memory in accordance with one clock of the clock signals, starting writing into said semiconductor memory from address 0 again after writing of the digital signals in address n, and simultaneously as the digital signals are written, reading digital signals written in said semiconductor memory n clock periods of the clock signals earlier.

19. A signal recording and playback apparatus for recording and playing back input signals on a signal recording medium, comprising:

a sensor provided externally of a body of the signal recording and playback apparatus for outputting trigger signals under prescribed conditions;

control means for controlling a recording operation on the signal recording medium to perform intermittent recording on the signal recording medium during a standby state while waiting for the trigger signals to be output and to perform continuous recording on the signal recording medium at a point in time when the trigger signals are output;

signal preserving means for temporarily preserving the input signals and outputting the preserved input signals in order of preservation; and switching means for switching a route of the input signals such that the input signals are recorded on the signal recording medium in the standby state prior to preservation in said signal preserving means and the preserved input signals from said signal preserving means are recorded on the signal recording medium at the point in time when the trigger signals are output, said signal preserving means preserving the input signals in order of input while simultaneously outputting the preserved input signals in the order of preservation at any time and repeatedly performing overwriting with new input signals after an amount of preserved input signals exceeds storage capacity, recording of the preserved input signals starting on the signal recording medium at the point in time when the trigger signals are output.

20. The signal recording and playback apparatus of claim 19, wherein the input signals are analog signals and said signal preserving means comprises:

analog-digital conversion means for converting the input signals into digital signals;

storage means, connected to said analog-digital conversion means, for temporarily writing the digital signals in a semiconductor memory and for reading out the digital signals from said semiconductor memory in order of storage;

digital-analog conversion means, connected to said storage means, for converting the readout digital signals into readout analog signals, the readout analog signals being the preserved input signals; and signal storage and control means for controlling said analog-digital conversion means, said storage means and said digital-analog conversion means based on clock signals.

21. The signal recording and playback apparatus of claim 20, wherein said semiconductor memory has (n+1) addresses designated as 0 to n, said storage means performing writing and reading of the digital signals in one address from said semiconductor memory in accordance with one clock of the clock signals, starting writing into said semiconductor memory from address 0 again after writing of the digital signals in address n, and simultaneously as the digital signals are written, reading digital signals written in said semiconductor memory n clock periods of the clock signals earlier.

22. The signal recording and playback apparatus for recording and playing back input signals on a signal recording medium, comprising:

a sensor provided externally of a body of the signal recording and playback apparatus for outputting trigger signals under prescribed conditions;

control means for controlling a recording operation on the signal recording medium to perform intermittent recording on the signal recording medium during a standby state while waiting for the trigger signals to be output and to perform continuous recording on the signal recording medium at a point in time when the trigger signals are output; and signal preserving means for temporarily preserving the input signals and outputting the preserved input signals in order of preservation, said signal preserving means preserving the input signals in order of input while simultaneously outputting the preserved input signals in the order of preservation at any time and repeatedly performing overwriting with new input signals after an amount of preserved input signals exceeds storage capacity, recording of the preserved input signals starting on the signal recording medium at the point in time when the trigger signals are output.

23. The signal recording and playback apparatus of claim 22, wherein the input signals are analog signals and said signal preserving means comprises:

analog-digital conversion means for converting the input signals into digital signals;

storage means, connected to said analog-digital conversion means, for temporarily writing the digital signals in a semiconductor memory and for reading out the digital signals from said semiconductor memory in order of storage;

digital-analog conversion means, connected to said storage means, for converting the readout digital signals into readout analog signals, the readout analog signals being the preserved input signals; and signal storage and control means for controlling said analog-digital conversion means, said storage means and said digital-analog conversion means based on clock signals.

24. The signal recording and playback apparatus of claim 23, wherein said semiconductor memory has (n+1) addresses designated 0 to n, said storage means performing writing and reading of the digital signals in one address of said semiconductor memory in accordance with one clock of the clock signals, starting writing into said semiconductor memory from said address 0 again after writing of the digital signals in address n, and simultaneously as the digital signals are written, reading digital signals written in said semiconductor memory n clock periods of the clock signals earlier.

* * * * *